United States Patent
Asano

(10) Patent No.: US 6,290,420 B1
(45) Date of Patent: Sep. 18, 2001

(54) CONNECTION STRUCTURE OF ELECTRICAL COMPONENT

(75) Inventor: Masahiro Asano, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/441,738

(22) Filed: Nov. 17, 1999

(30) Foreign Application Priority Data

Nov. 25, 1998 (JP) .................................................. 10-333797

(51) Int. Cl.[7] ....................................................... F16B 2/00
(52) U.S. Cl. .................. 403/2; 403/282; 403/365
(58) Field of Search .................... 403/383, 365, 403/404, 371, 24, 2, 281, 282

(56) References Cited

U.S. PATENT DOCUMENTS

| | | |
|---|---|---|
| 4,479,106 | 10/1984 | Shimizu et al. |
| 5,148,718 * | 9/1992 | Kakuguchi et al. .................... 74/553 |
| 5,460,035 | 10/1995 | Pfaffenberger . |
| 5,494,426 * | 2/1996 | Ibar ............................................ 425/3 |
| 6,015,523 * | 1/2000 | Yumoto ................................ 264/129 |
| 6,142,677 * | 11/2000 | Sato et al. ............................... 385/72 |

* cited by examiner

Primary Examiner—Harry C. Kim
(74) Attorney, Agent, or Firm—Brinks Hofer Gilson & Lione

(57) ABSTRACT

A connection structure of an electrical component is provided wherein the first connection member consists of liquid crystalline polymer synthetic resin. A weld joint is formed in the sleeve of the first connection member during the molding process. This weld joint permits the second connection member to be press-fitted into the first connection member by permitting the first connection member to fracture along the weld joint, thereby resulting in a tight connection between the first and second connection members.

2 Claims, 4 Drawing Sheets

CONNECTION STRUCTURE OF ELECTRICAL COMPONENT

BACKGROUND OF THE INVENTION

1. Field of the Invention

This invention relates to a connection structure of an electrical component such as a variable resistor.

2. Description of the Related Art

A connection structure of a conventional electrical component is described herein under with reference to FIG. 6 to FIG. 10 in which a variable resistor is exemplified.

A base plate 21 formed of a molded synthetic resin is flat and has a hole 21a at the center, and a U-shaped resistor (not shown in the drawing) and a circular collector (not shown in the drawing) are provided on the upper side of the base plate 21.

Terminals 22 and 23 are embedded on the base plate 21, the terminal 22 is connected to the collector and the terminals 23 are connected to the resistor.

A cover 24 formed of molded synthetic resin has a flat wall 24a, a side wall 24b which extends from the periphery of the flat wall 24a downward, a plurality of snaps 24c which extend downward from the bottom end of the side wall 24b, and a hole 24d formed at the center of the flat wall 24.

The cover 24 covers the top side of the base plate 21 so as to cover the resistor and collector, and is fixed to the base plate 21 by snapping the snaps on the periphery of the base plate 21.

The first connection member 25 consisting of polyacetal synthetic resin which constitutes a rotor has a sleeve 25b having a non-circular hole 25a and a plate 25c which extends radially from the sleeve 25b, and a moving contact 26 having contacts 26a and 26b is embedded on the connection member 25.

The connection member 25 is inserted supportingly to the hole 21a of the base plate 21 and the hole 24d of the cover 24, and attached rotatably to the base plate 21 and the cover 24.

When the connection member 25 is attached, the contact 26a is brought into contact with the collector slidably and the contact 26b is brought into contact with the resistor slidably.

The second connection member 27 which constitutes a shaft consists of metal material or synthetic resin material, and has a non-circular end 27a.

Because the first connection member 25 is formed of polyacetal synthetic resin, if the clearance between the hole 25a of the first connection member 25 and the end 27a of the second connection member 27 is zero, the end 27a is not inserted into the hole 25a, therefore a clearance K is provided between both members, and the end 27a is inserted into the hole 25a to connect the first connection member 25 to the second connection member 27.

When the second member 27, which is a shaft, is rotated, the first connection member 25, which is a rotor, is rotated, and the contacts 26a and 26b of the moving contact 26 are slid on the collector and resistor respectively with the rotation to change the resistance value.

Next, a method for fabrication of the first connection member 25 is described with reference to FIG. 10. A metal mold 28 comprises an inner mold 28a provided at the center for forming the hole 25a of the first connection member 25, and an outer mold 28d having a cavity 28b for forming the sleeve 25b and plate 25c and a gate 28c for injecting hot molten resin into the cavity 28b. Next, when molten polyacetal synthetic resin is injected into the cavity 28b from the gate 28c, polyacetal hot molten resin is jetted against the inner mold 28a and the stream is branched toward the arrow directions, the branched streams merge and are mixed at the position G located on the opposite side with the gate 28c, and then polyacetal synthetic resin is solidified and thus the molding of the first connection member 25 is completed.

Because polymer molecules of the polyacetal synthetic resin are entangled each other in molten state and solid state, when streams are merged at the position G on the opposite side with the gate 28c, the streams are mixed completely and form a molded product having no weld mark. Therefore, the sleeve 25b of the first connection member 25 exhibits little deformation, as the result, press fitting of the second connection member 27 into the sleeve 25b of the first connection member 25 having the structure as described above is difficult, and the first connection member 25 engages the second connection member with a play gap.

Because the first connection member 25 is formed of acetal synthetic resin, press fitting of the second connection member 27 into the first connection member 25 is difficult in the conventional connection structure of an electrical component, both members are connected with play and engaged with play.

The rotation of the second connection member 27 is transmitted to the first connection member 25 with play, and the rotation transmission is not correct.

SUMMARY OF THE INVENTION

In a first embodiment for solving the above-mentioned problem, the structure comprises the first connection member having a sleeve provided with a hole and the second connection member to be press-fitted into the hole, the first connecting member being formed of synthetic resin consisting of liquid crystalline polymer.

In a second embodiment, the sleeve has a weld mark formed in the insertion direction of the second connection member.

In a third embodiment, the first connection member constitutes a rotor and the second connection member constitutes a shaft.

DETAILED DESCRIPTION OF THE PREFERRED EMBODIMENT

Figure 1:
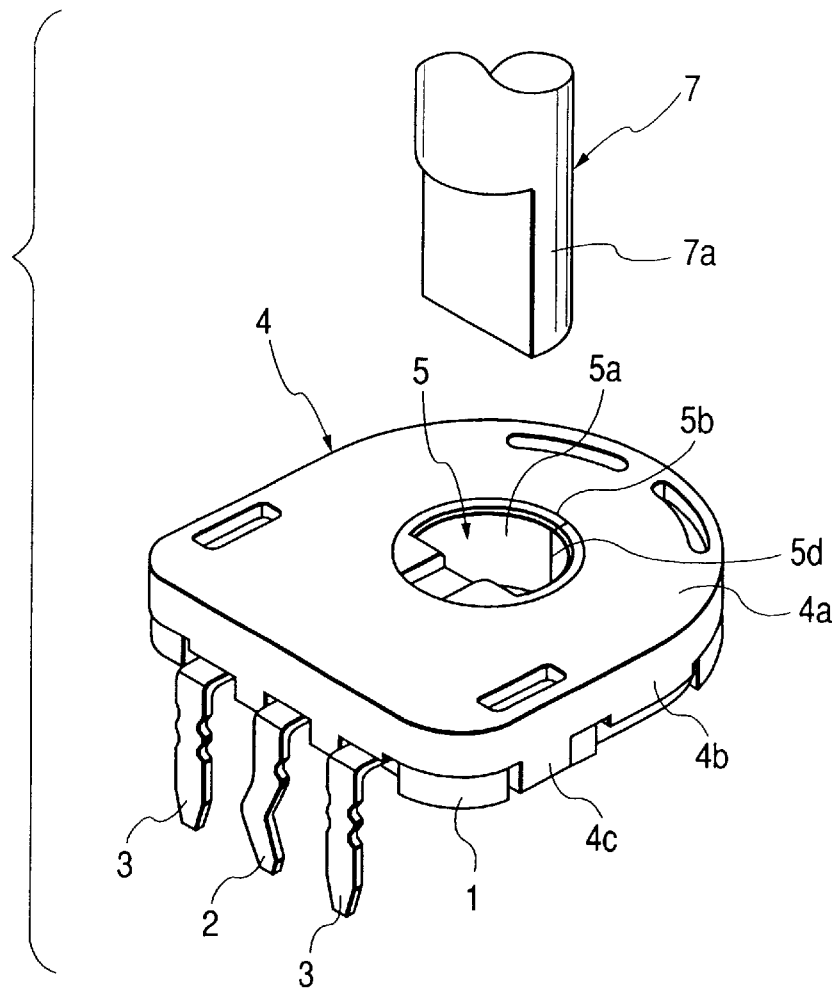
FIG. 1 is a perspective view for illustrating the connection structure of an electrical component of the present invention.
Figure 2:
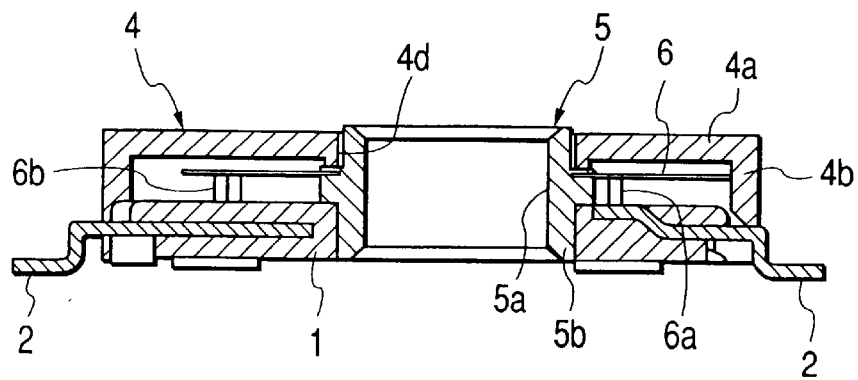
FIG. 2 is a cross sectional view for illustrating the connection structure of the electrical component of the present invention.
Figure 3:
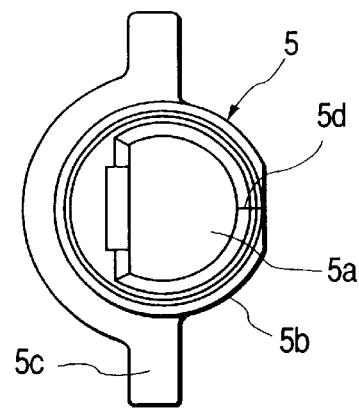
FIG. 3 is a plan view of the first connection member in accordance with the connection structure of the present invention.
Figure 4:
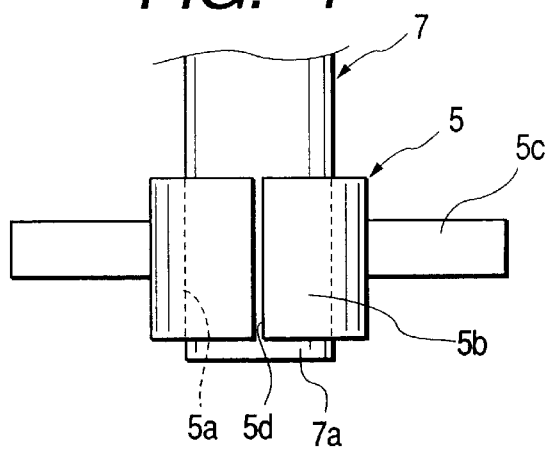
FIG. 4 is a diagram for illustrating the relation between the first and second connection members in accordance with the connection structure of the electrical component of the present invention.
Figure 5:
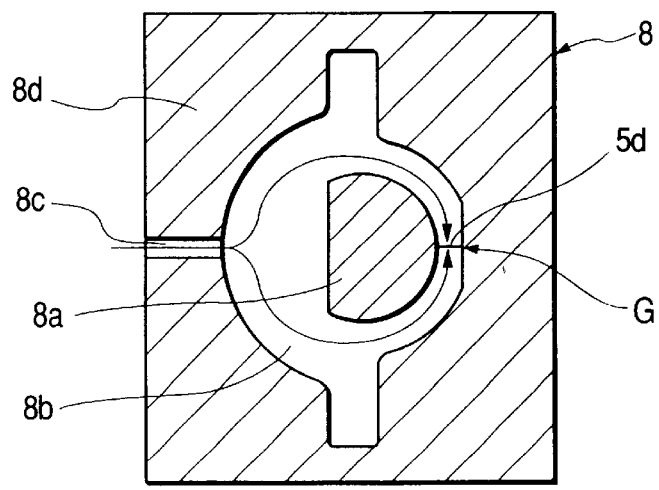
FIG. 5 is a diagram for illustrating a method for manufacturing the first connection member in accordance with the connection structure of the electrical component of the present invention.
Figure 6:
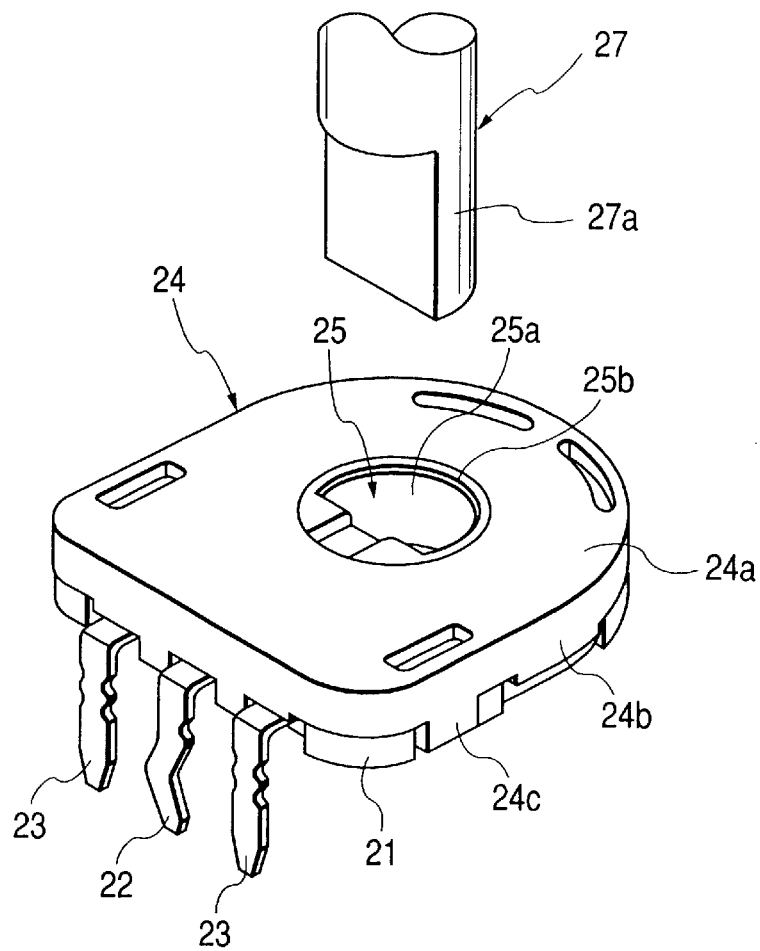
FIG. 6 is a perspective view for illustrating the connection structure of a conventional electrical component.
Figure 7:
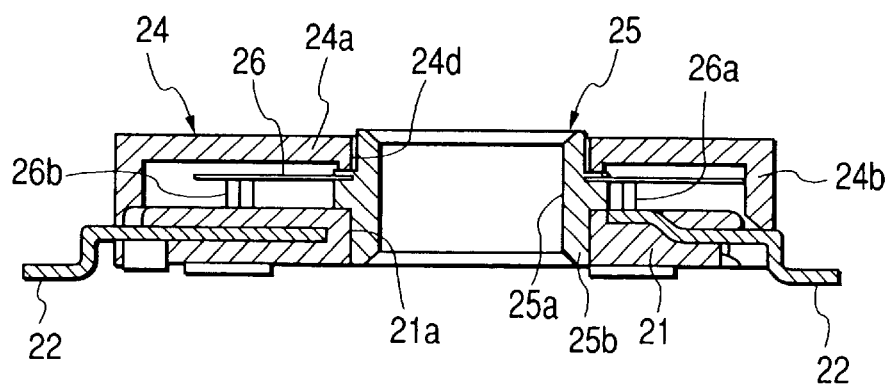
FIG. 7 is a cross sectional view for illustrating the connection structure of the conventional electrical component.
Figure 8:
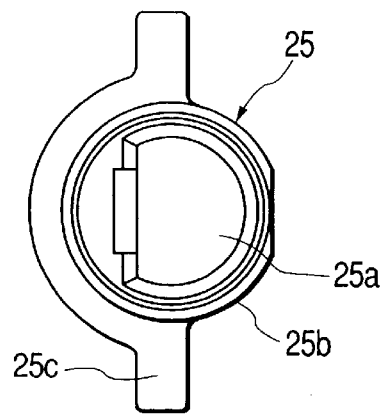
FIG. 8 is a plan view for illustrating the first connection member in accordance with the connection structure of the conventional electrical component.
Figure 9:
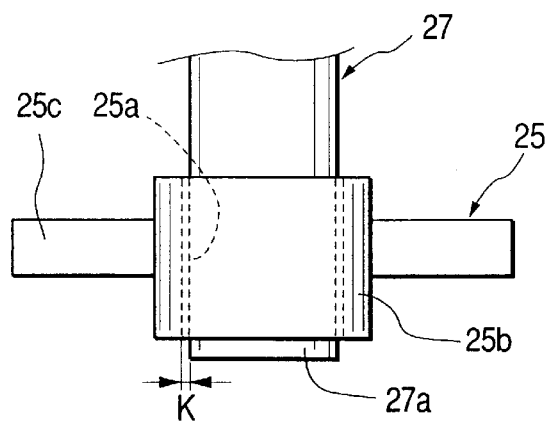
FIG. 9 is a diagram for illustrating the relation between the first and second connection members in accordance with the connection structure of the conventional electrical component.
Figure 10:
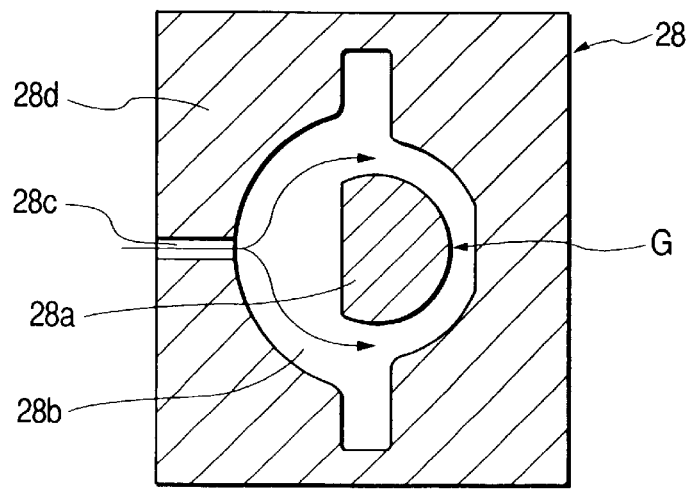
FIG. 10 is a diagram for illustrating a method for manufacturing the first connection member in accordance with the connection structure of the conventional electrical component.

The connection structure of an electrical component of the present invention will be described below with reference to the exemplified variable resistor shown in FIG. 1 to FIG. 5. FIG. 1 is a perspective view for illustrating the connection structure of an electrical component of the present invention, FIG. 2 is a cross sectional view for illustrating the connection structure of the electrical component of the present invention, FIG. 3 is a plan view of the first connection member in accordance with the connection structure of the electrical component of the present invention, FIG. 4 is a diagram for describing the relation between the first and second connection members in accordance with the connection structure of the electrical component of the present invention, and FIG. 5 is a diagram for describing a method for manufacturing the first connection member in accordance with the connection structure of the electrical component of the present invention.

The connection structure of the electrical component of the present invention is described with reference to the exemplified variable resistor shown in FIG. 1 to FIG. 5. Abase plate 1 comprising a molded product consisting of synthetic resin is flat, and has a hole 1a at the center, and a U-shaped resistor (not shown in the drawing) and a circular collector (not shown in the drawing) are provided on the top side of the base plate 1.

Terminals 2 and 3 are embedded on the base plate 1, the terminal 2 is connected to the collector, and the terminal 3 is connected to the resister.

A cover 4 comprising a molded product consisting of synthetic resin has a flat wall 4a, a side wall 4b which extends downward from the periphery of the flat wall 4a, a plurality of snaps 4c which extend downward from the bottom end of the side wall 4b, and a hole 4d provided at the center of the flat wall 4a.

The cover 4 covers the top side of the base plate 1 so as to cover the resistor and collector, and is fixed to the base plate 1 by snapping the snaps 4d on the side edge of the base plate 1.

The first connection member 5 which constitutes a rotor consists of liquid crystalline polymer synthetic resin, has a sleeve 5b having a non-circular hole 5a, a plate 5c which extends radially from the sleeve 5b, and a weld mark 5d formed in the axial direction on the sleeve 5b. A moving contact 6 having contacts 6a and 6b are embedded on the connection member 5. The connection member 5 is inserted supportingly into the hole 1a of the base plate 1 and the hole 4d of the cover 4, and attached to the base plate 1 and cover 4 rotatably. When the connection member 5 is attached, the contact 6a is in contact with the collector slidably, and the contact 6b is in contact with the resistor slidably.

The second connection member 7 which constitutes a shaft consists of metal material or synthetic resin material, and the end 7a of the second connection member 7 is non-circular.

Because the first connection member consists of liquid crystalline polymer synthetic resin, as shown in FIG. 3 and FIG. 4, the weld mark 5d is formed in the axial direction of the sleeve 5b namely in the insertion direction of the second connection member 7, and when the end 7a is press-fitted into the hole 5a with zero clearance between the hole 5a of the first connection member 5 and the end 7a of the second connection member 7, the sleeve 5b cracks widened and the cracked sleeve 5b holds the end 7a elastically, thus the first and second connection members 5 and 7 are connected.

When the second connection member 7, which is a shaft, is rotated, the first connection member 5, which is a rotor, is rotated, and the contacts 6a and 6b of the moving contact 6 slide on the collector and the resistor respectively with the rotation to vary the resistance value.

Next, a method for manufacturing the first connection member 5 is described with reference to FIG. 5. A metal mold 8 comprises an inner mold 8a provided at the center for forming the hole 5a of the first connection member 5, and an outer mold 8d having a cavity 8b for forming the sleeve 5b and the plate 5c and a gate 8c for injecting molten synthetic resin into the cavity 8b.

Next, when molten liquid crystalline polymer synthetic resin is injected into the cavity 8b from the gate 8c, the molten synthetic resin is jetted against the inner mold 8a and flows into branched passages along the arrows, branched streams merge at the position G on the opposite side with the gate 8c, the streams are mixed partially, and when liquid crystalline polymer synthetic resin is solidified the manufacturing of the first connection member 5 is completed.

Polymer molecules in the molten liquid crystalline polymer synthetic resin are oriented in the flow direction of the resin, and when the streams merge at the position G on the opposite side with the gate 8c, the first connection member having a weld mark 5d marked in the axial direction of the sleeve 5b is formed, the weld strength of this portion is very low. As the result, when the second connection member 7 is press-fitted into the sleeve 5b of the first connection member 5 having the structure as described herein above, the sleeve 5b cracks at the position of the weld mark 5d, and the crack brings about tight connection between the first and second connection members 5 and 7.

Because the first connection member 5 of the connection structure of an electrical component of the present invention consists of liquid crystalline polymer synthetic resin, a weld mark 5d is formed in molding, as the result, the second connection member 7 is press-fitted into the first connection member 5, when press-fitted the first connection member 5 cracks along the weld mark 5d, and the crack brings about tight connection between the first and second connection members, and thus the present invention provides a connection structure of an electrical component which realizes tight connection.

Furthermore, because the connection structure having no play between the first and second connection members 5 and 7 is realized, there is no play between the first and second connection members 5 and 7 in rotation transmission, as the result the present invention provides the connection structure of an electrical component which transmits rotation correctly.

Furthermore, because the sleeve 5b of the first connection member 5 is provided with the weld mark 5d in the insertion direction of the second connection member 7 to thereby form a crack on the sleeve 5b in the insertion direction of the second connection member 7. Therefore, the second connection member 7 is press-fitted into the first connection member 5 easily, and as the result the present invention provides the connection structure of an electrical component which is excellent in connection between the first and second connection members 5 and 7.

Furthermore, the first connection member 5 constitutes a rotor and the second connection member 7 constitutes a shaft, and particularly these members are used for an electrical component such as variable resistor in which rotation of the shaft is transmitted to the rotor used for electrical controlling. Accordingly, the present invention can provide the connection structure of an electrical component which is used for controlling consistently by means of rotation of a shaft without play.

What is claimed is:

1. A connection structure of an electrical component comprising:

a first connection member having a sleeve provided with a hole; and a second connection member to be press-fitted by insertion into said hole, wherein said first connection member is formed of synthetic resin comprised of liquid crystalline polymer, and a weld joint is formed in said sleeve in a direction parallel to an insertion direction of said second connection member into said hole, said weld joint providing a fracture line along which said sleeve may be fractured to permit said second connection member to be inserted into said hole.

2. The connection structure of an electrical component according to claim 1, wherein said first connection member constitutes a rotor and said second connection member constitutes a shaft.

* * * * *